Sept. 25, 1934.         K. E. KYLÉN              1,974,617
                BOND FOR BUILT-UP CRANK SHAFTS
                  Filed May 11, 1933     2 Sheets-Sheet 1
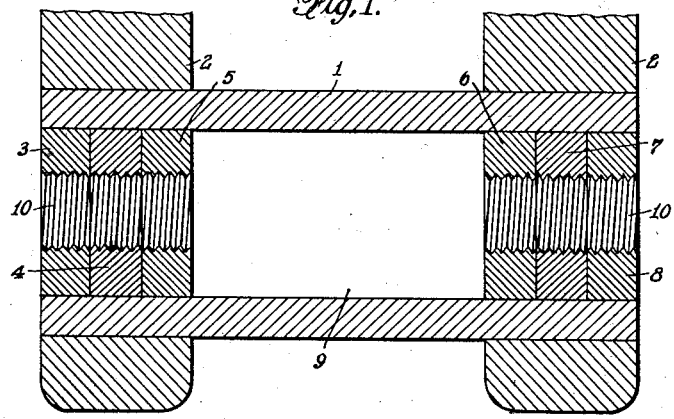
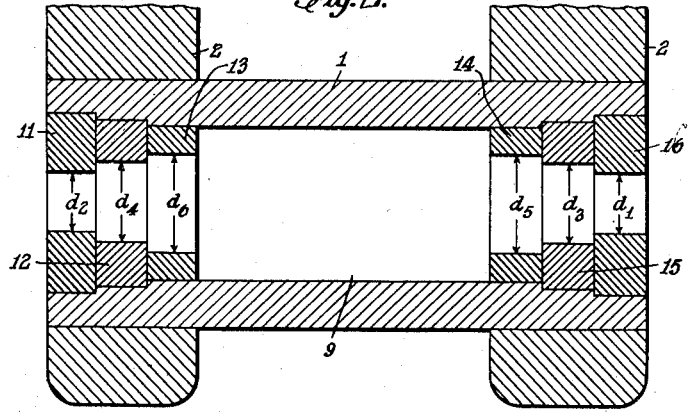
INVENTOR
KARL ERIK KYLÉN
BY
ATTORNEY Sept. 25, 1934.   K. E. KYLÉN   1,974,617
BOND FOR BUILT-UP CRANK SHAFTS
Filed May 11, 1933   2 Sheets-Sheet 2
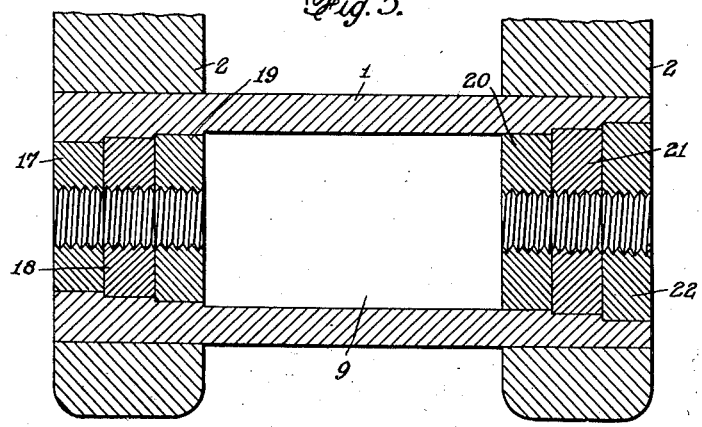
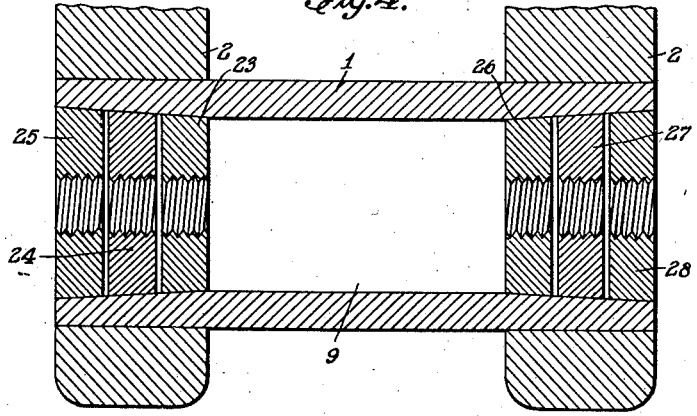
INVENTOR
KARL ERIK KYLÉN
BY
ATTORNEY

UNITED STATES PATENT OFFICE 1,974,617

BOND FOR BUILT-UP CRANK SHAFTS

Karl Erik Kylén, Gottenborg, Sweden, assignor to Aktiebolaget Svenska Kullagerfabriken, Gottenborg, Sweden, a corporation of Sweden Application May 11, 1933, Serial No. 670,440
In Sweden November 22, 1932

9 Claims. (Cl. 74—598)

This invention relates to improvements in built-up structures and has for an object to provide an improved device of this character which is particularly adapted for such work as crankshafts where it is desirable to securely fasten a pin to the side members, as for instance a crankpin to the webs.

It has been previously suggested to unite machine parts, as for instance the web and shaft or pin of a crank by providing the shaft or pin with a tapering or cylindrical cavity, into which a tapering or cylindrical plug can be forced to expand the shaft or pin in the web and thereby provide a strong bond or tie between the parts.

This method of uniting the parts is particularly adapted for the manufacture of built-up crankshafts provided with anti-friction bearings. One drawback of the method is, however, that the force required to press in the plug is considerable, especially when large crank shafts are to be assembled. This makes it necessary to return the shaft to the factory if repairs are required as ordinary repair shops may not have the machinery required to insert the plugs under great pressure.

The object of the present invention is to provide a bond or tie which, while possessing all the advantages of the above mentioned bond, will not require such great pressure to assemble but which can ordinarily be assembled by screw means without the said of special machinery.

The invention consists mainly in dividing the plug into two or more separate elements which can be inserted one after the other. Since the force required to insert the plug is a function of its length, it is possible to diminish this force to a fraction of that required by a whole plug by using two or more shorter plug elements which can be inserted separately one after the other. By making the total length of the plug elements equal to that of the whole plug the strength of the bond is made the same.

The accompanying drawings illustrate some forms of the invention as applied to built-up crankshafts.

Figure 1 shows a form of the invention in which all the elements of the plug member are of the same diameter.

Fig. 2 shows a form in which the plug elements have different diameters and are inserted in the crank pin in such a manner that plug elements of greater diameter are located outside plug elements having smaller diameter.

Fig. 3 shows a crank pin in which all the plug elements are inserted from the same side, and Fig. 4 finally shows a crank pin having a tapering bore at each end in which tapering plug elements are inserted.

Referring now to Fig. 1, the crank pin 1 is fixed to the webs 2 by pressing in plug elements 3, 4, 5 and 6, 7, and 8 of the same size at each joint. By making the external diameter of the plug members somewhat larger than the bore 9 of the crank pin, the crank pin will be expanded at the joints as the plug elements are driven in, thus causing the webs to firmly grip the pin. The crank is assembled by first driving the plug member 5 into place, then the member 4 and finally the member 3. The members 6, 7 and 8 are inserted in a similar manner. Only one third of the force required for the insertion of plug having a length equal to the total length of the three plug elements is required for driving in each separate plug element.

The plug elements are provided with threaded holes 10 to enable them to be withdrawn by means of a threaded tool which is screwed in to a depth approximately corresponding to the thickness of the plug element.

In the form of the invention illustrated in Fig. 2 the bore of the pin is stepped, and the diameter decreases inwardly. The plug elements 11, 12, 13, and 14, 15, 16 are also of different diameters. With this arrangement the distance that the inner plug elements need be pressed in under pressure is less than is the case with the form of the invention illustrated in Fig. 1. The plug 13 need be pressed in only a distance equal to its thickness while the plug 5 must be pressed in three times this distance. To enable the plug elements to be removed when it is desired to dismantle the shaft they are provided with through-going holes of different diameters. The plugs are removed by first inserting through the hole $d_2$ a bar having a diameter greater than the diameter $d_1$ but less than the diameter $d_2$ and therewith driving out the plug element 16. Thereafter the plug element 11 is driven out with a bar having a diameter greater than $d_2$ but less than $d_3$, inserted through $d_3$. The remaining plug elements can then be driven out by proceeding in a similar manner. The most suitable relation between the diameters of the holes is, therefore, $d_1 < d_2 < d_3 < d_4 < d_5 < d_6$.

In Fig. 3 is illustrated a form of the invention in which all plug elements 17, 18, 19 and 20, 21, 22, are inserted from the same end of the pin. This form is particularly suited for use in cases in which one end of the pin is inaccessible.

In Fig. 4 the plug elements 23, 24, 25 and 26, 27, 28, have tapering outer surfaces and are inserted in the tapering bore of the pin. This form has the advantages mentioned in connection with the stepped form illustrated in Fig. 2.

The plug elements are most suitably made with equal thicknesses, but may, if desired, be made of varying thicknesses. The fit between the plug element and the bore of the pin is suitably varied according to the thickness of the wall of the plug so that a plug element having a thinner wall thickness has a tighter fit than a plug element with greater wall thickness. Thus the plug element 13 in Fig. 2 would have a tighter fit than the plug element 11.

Having thus described my invention I claim and desire to secure by Letters Patent:

1. A bond for a built-up structure, comprising a member formed hollow at its bonding portion, a member having an opening for receiving such bonding portion, and a plug divided into two or more separate lengths, adapted to be individually forced into the said hollow.

2. A built-up structure, comprising a member formed hollow at its bonding portion, a second member having an opening in which the said bonding portion is seated, and a plug divided into a plurality of separate lengths seated in the said hollow and forcing the said bonding portion into bonding relation with the wall of the receiving opening of the second recited member.

3. A built-up structure, comprising a hollow pin, a pair of side members having openings in which the ends of the pin are seated, and a pair of plugs each divided into a plurality of separate lengths seated in respective ends of the hollow pin and forcing such ends into bonding relation with the walls of the receiving openings of the side members.

4. A built-up structure, comprising a hollow pin, a pair of side members having openings in which the ends of the pin are seated, and a pair of plugs each divided into a plurality of separate lengths seated in respective ends of the hollow pin and forcing such ends into bonding relation with the walls of the receiving openings of the side members, the hollow of the pin comprising a cylindrical bore.

5. A built-up structure, comprising a member formed hollow at its bonding portion, a second member having an opening in which the said bonding portion is seated, the hollow being stepped, and a plug divided in its length into a plurlity off separate elements, the elements being of different diameters and seated in the said hollow and forcing the said bonding portion into bonding relation with the wall of the receiving opening of the second recited member.

6. In a device of the character specified the combination with a hollow crank pin, its bore being stepped at each end thereby presenting a plurality of diameters having the greatest diameters at the outer ends of the bore, a pair of side members having openings in which the ends of the crank pins are seated and a pair of plug devices each divided into a plurality of separate lengths of different diameters seated in the respective ends of the bore of the pin at its respective ends and forcing such ends into bonding relation with the walls of the receiving openings of the side members.

7. In a device of the character specified the combination with a hollow crank pin, its bore being stepped at each end thereby presenting a plurality of diameters having the greatest diameters at the outer ends of the bore, a pair of side members having openings in which the ends of the crank pins are seated and a pair of plug devices each divided into a plurality of separate lengths of different diameters seated in the respective ends of the bore of the pin at its respective ends and forcing such ends into bonding relation with the walls of the receiving openings of the side members, the plug elements being formed with through-going holes of different diameters, the outer plug element at one end having the smallest diameter, the plug element at the other end having the next smaller diameter and the diameters alternating from side to side thereafter, whereby abutment faces are afforded for driving the plug elements out by the introduction of a suitable tool from the opposite end.

8. A built-up structure, comprising a hollow pin, a pair of side members having openings in which the ends of the pins are seated, and a pair of plugs each divided into a plurality of separate lengths seated in respective ends of the hollow pin and forcing such ends into bonding relation with the walls of the receiving openings of the side members, the hollow ends of the pin tapering outwardly and the outer surfaces of the plug elements being closely tapered.

9. A built-up structure, comprising a hollow pin, the bore of such hollow being stepped at each end, the steps being so related that the smallest step is at the outer side of one end and the largest step is at the outside of the other end, a pair of side members having openings in which the ends of the pin are seated and a pair of plugs each divided into a plurality of elements of separate lengths and of individual diameters to seat in the steps in the hollow ends of the pin for forcing such ends into bonding relation with the walls of the receiving opening of the side members, such plug elements being furnished with tool engaging surfaces and being individually removable from one end of the pin substantially as shown and described.

KARL ERIK KYLÉN.